US008615763B2

(12) United States Patent
Raghu et al.

(10) Patent No.: US 8,615,763 B2
(45) Date of Patent: Dec. 24, 2013

(54) SYSTEM AND METHOD OF TASK ALLOCATION IN MULTIPROCESSING ENVIRONMENT BASED ON MINIMUM DENSITY OR MAXIMUM HARMONICITY THAT RESULTS IN LOWER CLOCK FREQUENCY

(75) Inventors: Arvind Kandhalu Raghu, Pittsburgh, PA (US); Sejoong Lee, Allen, TX (US); Soon-Hyeok Choi, Plano, TX (US); Sandeep Bhadra, Dallas, TX (US); Xiaolion Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 12 days.

(21) Appl. No.: 13/363,983

(22) Filed: Feb. 1, 2012

(65) Prior Publication Data

US 2013/0198542 A1   Aug. 1, 2013

(51) Int. Cl.
  *G06F 9/46*   (2006.01)
(52) U.S. Cl.
  USPC .......................................... 718/100; 718/105
(58) Field of Classification Search
  None
  See application file for complete search history.

(56) References Cited

U.S. PATENT DOCUMENTS

| 7,412,353 B2 | 8/2008 | Borkar | |
|---|---|---|---|
| 2010/0235654 A1* | 9/2010 | Malik et al. | 713/300 |
| 2010/0332876 A1* | 12/2010 | Fields et al. | 713/323 |
| 2012/0117403 A1* | 5/2012 | Bieswanger et al. | 713/322 |

OTHER PUBLICATIONS

New Schedulability Tests for Real-Time task sets scheduled by Deadline Monotonic on Multiprocessors Marko Bertogna, Michele Cirinei, Giuseppe Lipari OPODIS'05 Proceedings of the 9th International Conference on Principles of Distributed Systems, p. 306-321 2005.*
100% CPU Use with Rate Monotonic Scheduling <http://beterembsw.blogspot.com/2010/08/100-cpu-use-with-rate-monotonic.html> Phil Koopman Carnegie Mellon University, Aug. 16, 2010.*
Coordinated Power Management of Periodic Real-Time Tasks on Chip Multiprocessors; V. Devadas et al.; 2010 International Green Computing Conference; Aug. 15-18, 2010; pp. 61-72.
Dynamic Task Allocation Strategies in MPSoC for Soft Real-time Applications Eduardo Wenzel Briao et al; Proceedings of Conf on Design, Automation and Test; 2008; pp. 1386-1389.
Dynamic Voltage and Frequency Scaling for Real-Time Scheduling on a Prioritized SMT Processor K. Fujii et al.; 2011 International Conference on Embedded and Real-Time Computing Systems and Applications (RTCSA), (vol. 2); Aug. 28-31, 2011; pp. 9-15

(Continued)

*Primary Examiner* — Meng An
*Assistant Examiner* — James J Lee
(74) *Attorney, Agent, or Firm* — Robert D. Marshall, Jr.; W. James Brady; Frederick J. Telecky, Jr.

(57) ABSTRACT

Systems and Methods for task allocation in a multiprocessor environment employing power management techniques are described wherein tasks are allocated relative to the density given by the ratio of worst-case-execution time and deadline of a task and also the harmonicity of a task's period with respect to a task-set. Tasks are allocated to a given processor based on either minimum density or maximum harmonicity depending on which allocation results in a lower clock frequency. Assigning a task to the processor with lowest density results in balancing the density across processors while assigning task to the processor with maximum harmonicity attempts to maximize the utilization of the processor.

7 Claims, 3 Drawing Sheets

(56) References Cited

OTHER PUBLICATIONS

Dynamic Voltage Scaling With Reduced Frequency Switching and Preemptions; Mohan et al.; International Journal of Electrical and Electronics Engineering (IJEEE), vol. 1 ,Issue-1 ,2011; p. 1.

Energy Efficient Multiprocessor Task Scheduling under Input-Dependent Variation; J. Cong et al.; Design, Automation & Test in Europe Conference & Exhibition, 2009; Apr. 20-24, 2009; pp. 411-416.

Energy-Aware Partitioning for Multiprocessor Real-Time Systems; H. Aydin et al.; Parallel and Distributed Processing Symposium, 2003. Proceedings. International; Apr. 22-26, 2003.

Energy-Aware Scheduling for Real-Time Multiprocessor Systems with Uncertain Task Execution Time; C. Xian et al.; Proceedings of the 44th annual Design Automation Conference; 2007; pp. 664-669.

Energy-Aware Task Allocation for Network-on-Chip Based Heterogeneous Multiprocessor Systems; Jia Huang et al.; 2011 19th Euromicro International Conference on Parallel, Distributed and Network-Based Processing (PDP); Feb. 9-11, 2011; pp. 447-454.

Energy-Aware Task Scheduling With Task Synchronization for Embedded Real-Time Systems; IEEE Transactions on Computer-Aided Design of Integrated Circuits and Systems (vol. 25, Issue: 6); Jun. 2006; pp. 1024-1037.

Energy-Efficient Scheduling for Real-Time Systems on Dynamic Voltage Scaling (DVS) Platforms; Jian-Jia Chen et al; 13th IEEE International Conference on Embedded and Real-Time Computing Systems and Applications, 2007. RTCSA 2007; Aug. 21-24, 2007; pp. 28-38.

Energy-Optimal Software Partitioning in Heterogeneous Multiprocessor Embedded Systems; Michale Goraczko et al; Proceedings of the 45th annual Design Automation Conference; 2008; pp. 191-196.

Evaluating Energy-Aware Task Allocation Strategies for MPSOCS; Model-Driven Design to Resource Management for Distributed Embedded Systems IFIP International Federation for Information Processing vol. 225, 2006, pp. 215-224.

Power-Aware Scheduling for and/or Graphs in Real-Time Systems; D. Zhu et al.; IEEE Transactions of Parallel and Distributed Systems, (vol. 15, Issue: 9); Sep. 13, 2004; pp. 849-864.

Power-Aware CPU Management in QoS-Guaranteed Systems; Seowanee Saewong; Carnegie Mellon University; Thesis; May 2007.

Power-Aware Load Balancing of Large Scale MPI Applications; M. Etinski et al.; IEEE International Symposium on Parallel & Distributed Processing, 2009. IPDPS 2009; May 23-29, 2009; pp. 1-8.

Power-Aware Resource Allocation for Independent Tasks in Heterogeneous Real-Time Systems; Yu Yang et al.; Ninth International Conference on Parallel and Distributed Systems, 2002. Proceedings; Dec. 17-20, 2002; pp. 341-348.

Power-Aware Scheduling of Conditional Task Graphs in Real-Time Multiprocessor Systems; Dongkun Shin et al.; Proceedings of the 2003 international symposium on Low power electronics and design; pp. 408-413.

Power-Aware scheduling under timing constraints for mission-critical embedded systems; Jinfeng Liu et al.; Proceedings of the 38th annual Design Automation Conference; 2001; pp. 840-845.

Practical voltage-scaling for fixed-priority RT-Systems; S. Saewong et al.; The 9th IEEE Proceedings; Real-Time and Embedded Technology and Applications Symposium, 2003; May 27-30, 2003; pp. 106-114.

Real-Time Multimedia Processing in Video Sensor Networks; Signal Processing: Image Communication; Yaoyao Gu et al.; vol. 22, Issue 3, Mar. 2007, pp. 237-251.

Scheduling Algorithms for Multiprogramming in a Hard-Real-Time Environment C. L. Liu et al.; Journal of the ACM (JACM); vol. 20 Issue 1, Jan. 1973; pp. 46-61.

Scheduling with Dynamic Voltage/Speed Adjustment Using Slack Reclamation in Multiprocessor Realtime Systems; D. Zhu et al.; IEEE Transactions on Parallel and Distrubuted Systems (vol. 14, Issue: 7); Jul. 2003; pp. 686-700.

System-Level Power-Aware Design Techniques in Real-Time Systems; O. S. Unsal et al.; Proceedings of the IEEE (vol. 91, Issue 7); Jul. 28, 2003; pp. 1055-1069.

Temperature Aware Task Scheduling in MPSoCs; Coskun et al.; Proceedings of the Conference on Design, Automation and Test in Europe; 2007; pp. 1659-1664.

A Simple Power-Aware Scheduling for Multicore Systems When Running Realtime Applications; D. Bautista et al.; IEEE International Symposium on Parallel and Distributed Processing, 2008. IPDPS 2008; Apr. 14-18, 2008; pp. 1-7.

MORA: An Energy-Aware Slack Reclamation Scheme for Scheduling Sporadic Real-Time Tasks upon Multiprocessor Platforms V. Nelis et al.; 15th IEEE International Conference on Embedded and Real-Time Computing Systems and Applications, 2009. RTCSA '09, Aug. 24-26, 2009; pp. 210-215.

ETAHM: An Energy-Aware Task Allocation Algorithm for Heterogeneous Multiprocessor Po-Chun Chang et al; Design Automation Conference, 2008. DAC 2008. 45th ACM/IEEE, Jun. 8-13, 2008; pp. 776-779.

Analysis of Dynamic Voltage/Frequency Scaling in Chip-Multiprocessors S. Herbert et al.; 2007 ACM/IEEE International Symposium on Low Power Electronics and Design (ISLPED); Aug. 27-29, 2007; pp. 38-43.

Approximation Algorithms for Multiprocessor Energy-Efficient Scheduling of Periodic Real-Time Tasks with Uncertain Task Execution Time; Jian-Jia Chen et al.; Real-Time and Embedded Technology and Applications Symposium, 2008. RTAS '08. IEEE; Apr. 22-24, 2008; pp. 13-23.

Architectural Issues in Homogeneous NoC-Based MPSoC; G. Sassatelli et al.; 18th IEEE/IFIP International Workshop on Rapid System Prototyping, 2007. RSP 2007; May 28-30, 2007; pp. 139-142.

* cited by examiner

US 8,615,763 B2

SYSTEM AND METHOD OF TASK ALLOCATION IN MULTIPROCESSING ENVIRONMENT BASED ON MINIMUM DENSITY OR MAXIMUM HARMONICITY THAT RESULTS IN LOWER CLOCK FREQUENCY

FIELD OF THE INVENTION

The invention generally relates to the field of multiprocessing and more specifically to task allocation and efficient power management in a multiprocessing environment.

BACKGROUND OF THE INVENTION

In multiprocessor systems, task-allocation techniques known as load balancing are traditionally used to distribute workload across multiple processors in an attempt to evenly allocate tasks or to achieve optimal resource utilization. Load balancing typically takes into account factors such as the reported load of a given processor, response times, up/down status, or how much traffic it has recently been assigned. High-performance systems may use multiple layers of load balancing.

It is known that power consumption in CMOS circuits is proportional to the product of the frequency and the square of the supply voltage. In order to conserve power, power management techniques known as Dynamic Voltage Scaling (DVS) or Dynamic Voltage and Frequency Scaling (DVFS) have been developed to modulate the clock frequency and/or the supply voltage of the processors in a multiprocessor based system. Typically, several discrete operating points (OPP) of operating frequencies and supply voltages are available under DVFS techniques rather than a continuous continuum of frequency and voltage combinations. It is desirable for a DVFS-capable system to operate at as low OPP as possible unless the processing speed is too slow so that the tasks running in the system violate their deadlines.

Supporting separate DVFS feature for individual processor in a multiprocessors system is costly as a separate power supply must be supplied to each processor. For cost effective design, it is typical to use a shared power supply and clock for a group of processors. In this situation, load balancing among the processors sharing the same OPP is desirable as the OPP will be determined based on the maximum OPP requirement of the processors.

Lower utilization or more balanced processor utilization through load balancing does not necessarily mean a lower OPP in DVFS-capable systems. Task deadlines play an important role in determining the OPP while load-balancing however only concerns the number of computation cycles of the tasks. Therefore, conventional load-balancing task allocation may result in un-balanced OPP requirements of multiple processors in a multiprocessing environment.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Figure 1:
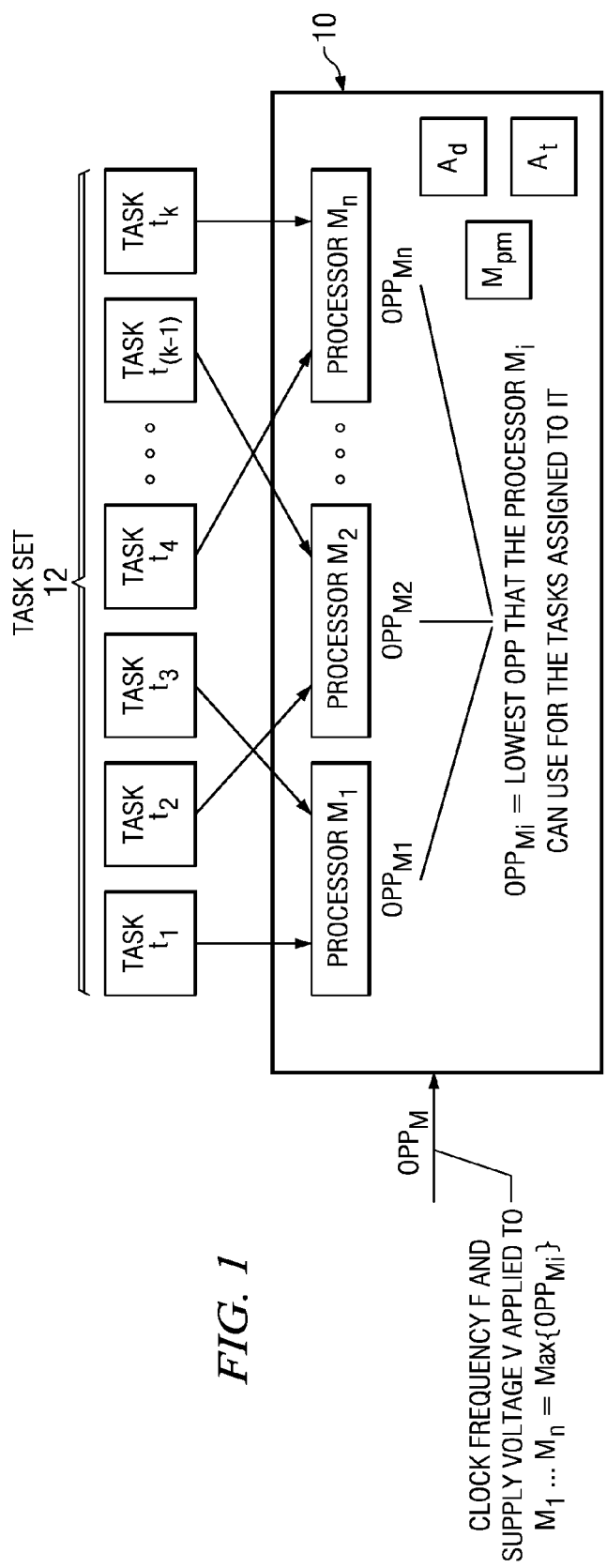
FIG. 1 is a block diagram of a multiprocessor system employing dynamic voltage frequency scaling power management and task allocation techniques in accordance with principles of the present invention.

Reference is now made to the Figures wherein like numerals indicate corresponding parts throughout the several views. FIG. 1 depicts a multiprocessor system 10 employing a dynamic voltage frequency scaling (DVFS) power management technique that varies the clock frequency F and supply voltage V applied to processors $M_1 \ldots M_n$ and a method of task allocation of task set 12 in accordance with the principles of the present invention. It is to be understood that while the multiprocessor system 10 is described as comprising discrete processors $M_1 \ldots, M_n$ a multi-core processor manufactured on a unitary integrated circuit die could be used without departing from the scope of the invention. In this regard, the terms "processor" and "core" are used interchangeably throughout the specification. The multiprocessor system 10 comprises a plurality of processors (cores) $M_1 \ldots, M_n$, power management processor $M_{pm}$, and memory arrays $A_d$ and $A_t$. Power management processor $M_{pm}$ may be embodied as one of the plurality of processors (cores) $M_1, \ldots, M_n$ or it may be a separate processor, preferably low power and dedicated for allocating the task set 12 among the plurality of processors (cores) $M_1, \ldots, M_n$. In the present example, processors $M_1, \ldots, M_n$ are similar in terms of processing power, speed and energy characteristics. It should be understood that those of ordinary skill in the art will recognize that the present invention can be adapted to work with processors $M_1, \ldots, M_n$. having diverse characteristics.

FIG. 1 depicts task set 12 comprising a plurality of periodic real-time tasks $\tau_1 \ldots \tau_k$. Each task $\tau_i$ is characterized by the worst-case number of processor cycles $C_i$, period $T_i$, and deadline $D_i$. The utilization $u_i(F)$ of a particular task $\tau_i$ under a clock frequency of F is expressed by: $u_i(F)=C_i/(T_i*F)$. As described in more detail below, the present invention employs the deadline $D_i$ and the harmonicity of the period $T_i$ (aka periodicity) characteristics in allocating tasks.

Traditional load balancing does not necessarily result in minimizing the maximum $OPP_M$ required for processors $M_1, \ldots, M_n$ executing task set 12 when the deadline $D_i$ of a particular task $\tau_i$ is less than its period $T_i$. The disconnection between load balancing and minimizing the required maximum $OPP_M$ occurs as a result of the slack between a task $\tau_i$ completing before its current deadline $D_i$ and the arrival of the next instance of task $\tau_i$. Traditional DVFS techniques reduce the processor clock frequency F such that a particular task $\tau_i$ completes by its deadline only and not before their next arrival time (period). This means that tasks with short deadlines even if they have long periods will have to be executed at higher clock-frequencies. Therefore in accordance with the principles of the present invention, the ratio of processor cycles $C_i$ to its current deadline $D_i$ is balanced across the processors $M_1, \ldots, M_n$, instead of utilization. Whereas utilization used in traditional load balancing is defined as the ratio of processor cycles $C_i$ to its current period $T_i$, the task density $d_i$ of a task $\tau_i$ is defined as the ratio of processor cycles $C_i$ to its current deadline $D_i$.

Figure 2:
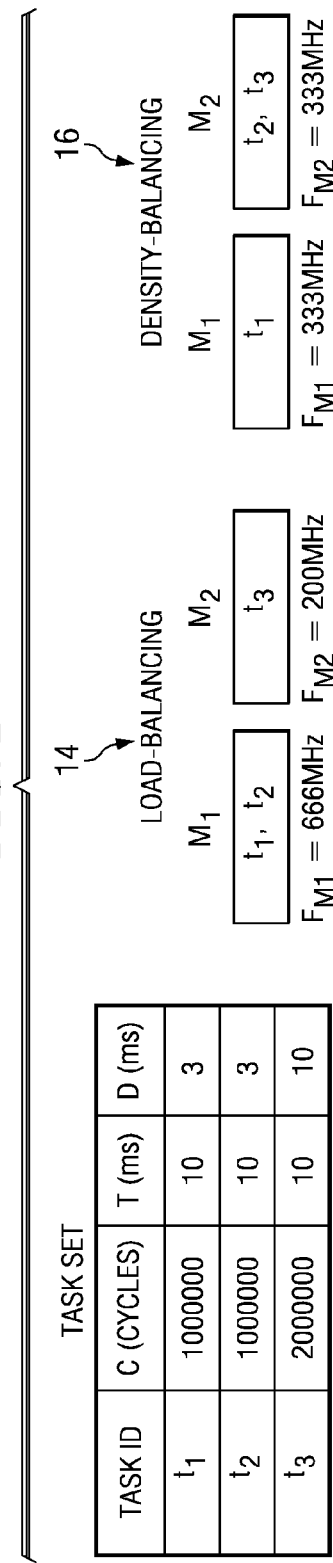
FIG. 2 is a block diagram illustrating the distinctions between load-balancing task allocation and density-balancing task allocation; and, FIGS. 3a and 3b together form a flow chart of a density-balancing task allocation method in accordance with principles of the present invention.

Referring now to FIG. 2, an illustrative block diagram illustrates the distinctions between load-balancing task allocation 14 and density-balancing task allocation 16. By way of example, in load-balancing task allocation 14, tasks $\tau_1$ and $\tau_2$ are assigned to processor $M_1$ while task $\tau_3$ is assigned to processor $M_2$. FIG. 2 depicts the minimum clock frequencies that satisfy the deadlines $D_1$, $D_2$ and $D_3$ of tasks $\tau_1$, $\tau_2$ and $\tau_3$ as 666 MHz and 200 MHz for processors $M_1$ and $M_2$, respectively. In contrast, under density-balancing task allocation 16, task $\tau_1$ is assigned to $M_1$, while tasks $\tau_2$ and $\tau_3$ are assigned to processor $M_2$ permitting the minimum clock frequencies of processors $M_1$ and $M_2$ that satisfy the deadlines $D_1$, $D_2$ and $D_3$ of tasks $\tau_1$ $\tau_2$ and $\tau_3$ to be 333 MHz and 333 MHz, respectively.

Another factor that plays an important role in DVFS is the harmonicity of the task period $T_i$. DVFS slows down the frequency of the clock to the processor such that tasks complete just before their deadlines. For simplicity, assume deadlines $D_i$ are equal to the periods $T_i$ for all the tasks. Consider the utilization for two-tasks in an uniprocessor system for rate-monotonic-scheduling:

$$U=1-f(1-f)/(I+f)$$

$$I=\lfloor T_2/T_1 \rfloor, f=\{T_2/T_1\}$$

$$\{T_2/T_1\}=(T_2/T_1)-\lfloor T_2/T_1 \rfloor$$

Wherein f denotes the fractional part of $T_2/T_1$

When $T_2$ is a multiple of $T_1$, 'f' becomes zero indicating that utilization U becomes 1.0. This result can be extended for n tasks, by making $\{T_n/T_i\}=0$ for i=1, 2, ..., n-1. Hence, the more the number of harmonic tasks in a given task-set the lower the power consumption and maximal power-savings by DVFS can be achieved if all the tasks are harmonic with each other.

Harmonicity of a task $\tau_i$ against a set of tasks $\{\tau_k\}$ is defined below.

$$H_i = \sum_k \left\{ \left(\frac{T_j}{T_k}\right) - \left\lfloor \frac{T_j}{T_k} \right\rfloor \right\}$$

A lower $H_i$ value means that $\tau_i$ is more harmonized with a set of tasks $\{\tau_k\}$. Accordingly, the present invention minimizes the harmonicity of tasks in each processor, which can minimize the OPP required by each processor.

Figure 3A:
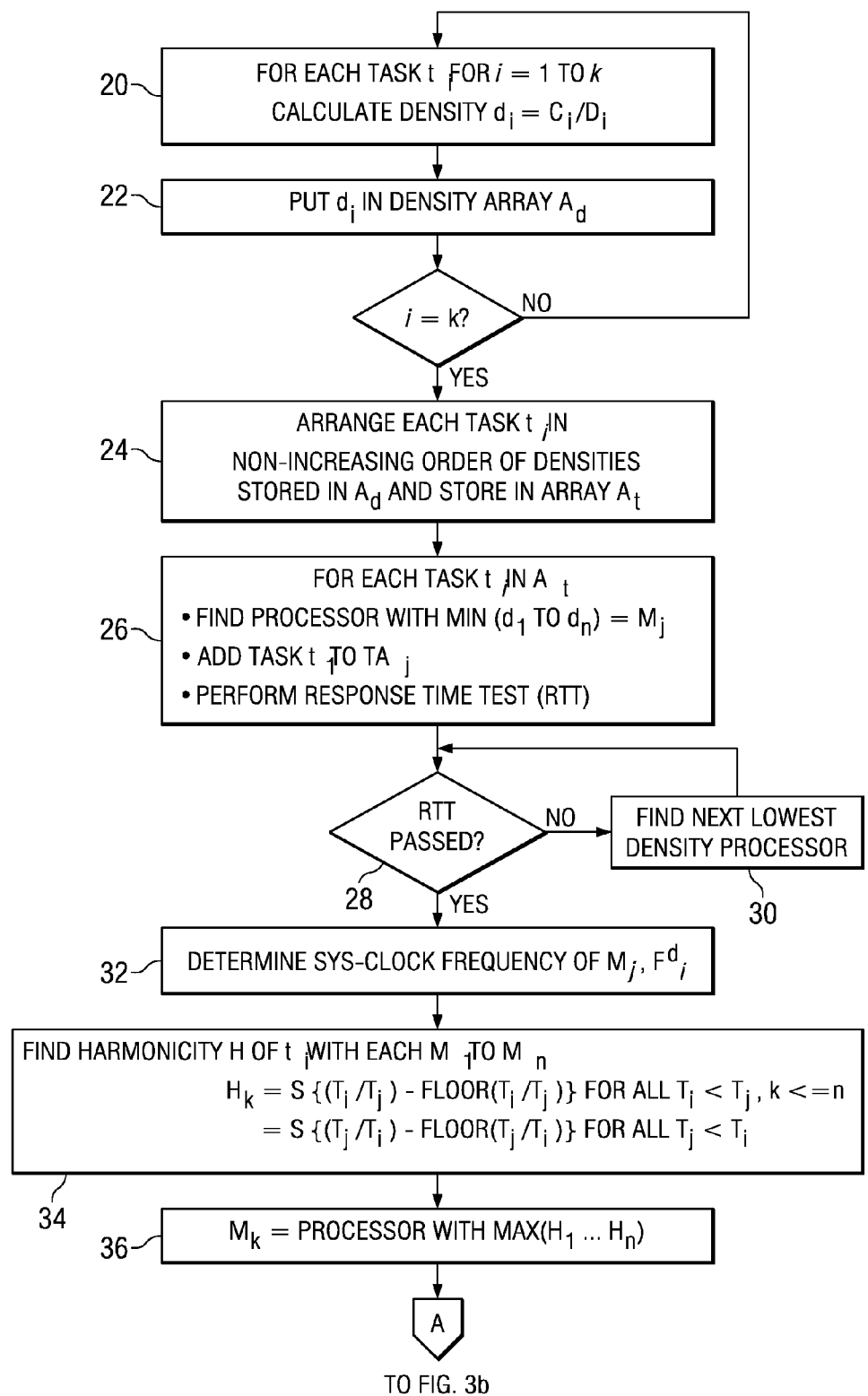
Figure 3B:
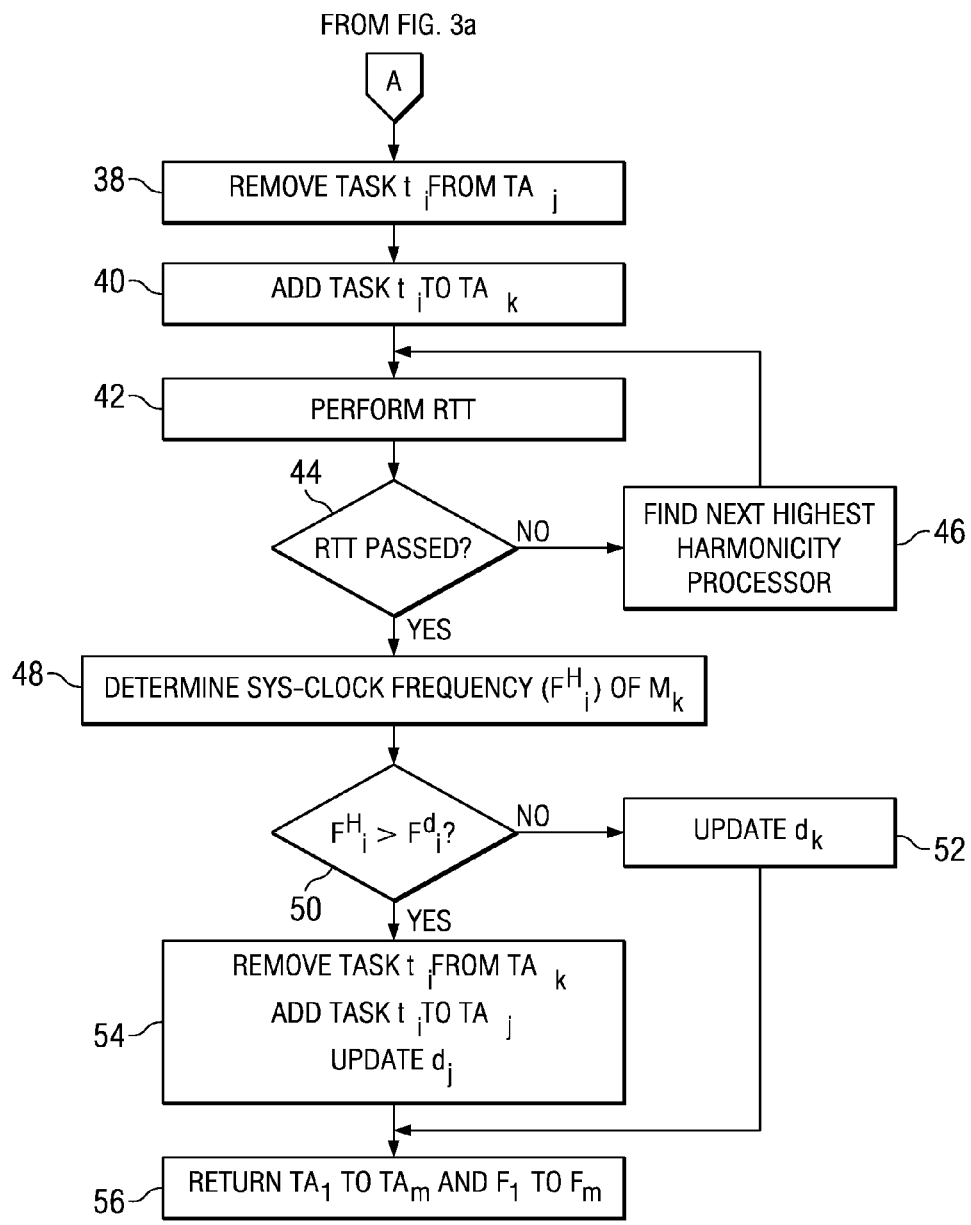

Reference is now made to FIGS. 3a and 3b and Table 1 below depicting the density-balancing task allocation method of the present invention. The steps of the method depicted in the flowchart of FIGS. 3a and 3b are exemplified by the code in Table 1. As depicted in FIGS. 3a and 3b the code in Table 1 is preferably executed by power management processor Mpm, which stores calculated values in memory arrays Ad and At. It is to be understood however that the steps could be performed on one of the general purpose processors M1, ..., Mn.

Each task τi has associated with it a value for the worst-case number of processor cycles Ci needed for completion, its period Ti, and its deadline Di. The maximum number of processors in a multiprocessing system is denoted by the value n. Referring now to FIG. 3a, at Step 20 a task density di is calculated for each task τi . . . τk in task set 12. Each task density di is then stored in memory denoted as density array Ad in step 22. At step 24, each task τi is stored in non-increasing order of density in array At. At step 26 a processor Mj is selected having the minimum task density between d1 to dn for each task τi in array At. Task τi is then added to task allocation array TAj. A Response Time Test (RTT) is then performed at step 28 to identify if the selected processor Mj can perform the task without violating its allotted time slot. If the RTT does not pass, the next lowest density processor Mj, is selected at step 30 and then steps 28 and 30 are repeated until the RTT is passed.

Once $M_j$ is selected, the Sys-clock frequency $F^d_i$ of $M_j$ is determined at Step 32. Details of selecting the Sys-clock frequency $F^d_i$ are described by Saowanee Saewong and Raj Rajkumar, in "Practical Voltage-Scaling for Fixed-Priority RT-Systems," Proceedings of the 9th IEEE Real-Time and Embedded Technology and Applications Symposium, 2003, pp 106-114, herein incorporated by reference.

At step 34, the harmonicity (H) of each task τi is calculated for processors M1, . . . Mn. Mathematically, this is represented by:

$$H_k = \Sigma\{(Ti/Tj) - \text{floor}(Ti/Tj)\} \text{ for all } Ti < Tj, k <= n$$

$$= \Sigma\{(Tj/Ti) - \text{floor}(Tj/Ti)\} \text{ for all } Tj < Ti$$

The processor with the highest harmonicity is assigned as $M_k$ at step 36. Referring now to FIG. 3b, at step 38, task τi is removed from task allocation TAj array and added to task allocation TAk array at step 40. Another RTT is performed at step 42 and tested for passing at step 44. If the RTT fails then the next highest harmonicity processor is found at step 46 and steps 42-46 are repeated until the RTT passes and progresses to step 48 where the Sys-clock frequency FHi of processor of Mk is determined. At step 50, Sys-clock frequency FHi is tested to see if it is greater than Fdi. If FHi is not greater than Fdi, then at step 52, density dk is updated and TA1 is returned to TAm and F1 is returned to Fm at step 56. Otherwise however if FHi is greater than Fdi, then at step 54 task τi is removed from TAk and added to TAj and density dj is updated.

TABLE 1

Inputs:
   ($C_i$, $T_i$, $D_i$) of each task $\tau_i$, i = 1 to k where k is total number of tasks.
   Maximum number of processors is 'n'.
Outputs:
   Task allocation $TA_j$ for each of the processors: $\{M_1, M_2, \ldots, M_n\}$
   Sys-clock frequency for each processor is the minimum clock frequency that still makes the processor satisfy all the tasks' deadline.
Harmonicity Aware Density Balancing Method
   For each task $\tau_i$
     Calculate density $d_i = C_i / D_i$
     Put $d_i$ in density array $A_d$
   End for
   Arrange tasks in non-increasing order of densities stored in $A_d$ and store in array $A_t$
   For each task $\tau_i$ in $A_t$
     Find processor with min($d_1$ to $d_m$) = $M_j$
     Add task $\tau_i$ to $TA_j$
     Perform Response Time Test (RTT),
        If RTT not passed, find next lowest density processor.
     Determine Sys-clock frequency of $M_j$, $F_i^d$
     Find Harmonicity H of $\tau_i$ with each $M_1$ to $M_m$.

$$H_k = \sum \{(T_i/T_j) - \text{floor}(T_i/T_j)\} \text{ for all } T_i < T_j, k <= m$$

$$= \sum \{(T_j/T_i) - \text{floor}(T_j/T_i)\} \text{ for all } T_j < T_i$$

$M_k$ = processor with max($H_1 \ldots H_m$)
     Remove task $\tau_i$ from $TA_j$
     Add Task $\tau_i$ to $TA_k$
     Perform Response Time Test (RTT),
        If RTT not passed, find next highest harmonicity processor.
     Determine Sys-clock frequency of $M_k$, $F_i^H$.
     If $F_i^H > F_i^d$
        Remove task $\tau_i$ from $TA_k$
        Add Task $\tau_i$ to $TA_j$
        Update $d_j$
     Else
        Update $d_k$
     End if
   End for
   Return $TA_1$ to $TA_m$ and $F_1$ to $F_m$ Thus, specific systems and methods of task allocation in a multiprocessing environment having power management have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the embodiments of the invention find particular application to systems using Digital Signal Processors (DSPs), implemented, for example, in an Application Specific Integrated Circuit (ASIC), other embodiments may find application to other types of systems, which may have another type of processors. Various other embodiments of the invention will be apparent to persons skilled in the art upon reference to this description.

What is claimed is:

1. A multiprocessor system employing a power management technique comprising:
   (a) a plurality of processors for executing a plurality of tasks in a task-set; and,
   (b) means for allocating the plurality of tasks among the plurality of processors operable to
     (a) associate a worst-case number of processor cycles $C_i$ needed for completion, a period $T_i$, and a deadline $D_i$ for each task $\tau_i$ of a plurality of tasks;
     (b) calculate a task density $d_i$ for each task $\tau_i$ as follows $$d_i = \frac{C_i}{D_i};$$

(c) store each task density $d_i$ in a first density array;
     (d) store each task $\tau_i$ in non-increasing order of density in a second array;
     (e) select a processor $M_j$ having a minimum task density between $d_1$ and $d_n$ for each task $\tau_i$ in the second array;
     (f) add the task $\tau_i$ to a task allocation array $TA_j$;
     (g) perform a first response time test to identify if the selected processor $M_j$ can performance the added task $\tau_i$ without violating its allotted time slot;
     (h) if the first response time test does not pass, select a processor $M_j$ having a next lowest task density between $d_1$ and $d_n$ for each task $\tau_i$ in the second array and repeat until the first response time test passes;
     (i) determine a Sys-clock frequency $F^d_i$ of $M_j$ as a minimum frequency enabling processor $M_j$ to complete its tasks before their respective deadlines;
     (j) calculate a harmonicity $H_i$ of each task $\tau_i$ for processors $M_1, \ldots, M_n$ as follows $$H_i = \sum_j \left\{\left(\frac{T_i}{T_j}\right) - \left\lfloor\frac{T_j}{T_j}\right\rfloor\right\} \text{ for } T_i < T_j, k \leq n, \text{ and}$$

$$= \sum_j \left\{\left(\frac{T_j}{T_i}\right) - \left\lfloor\frac{T_j}{T_i}\right\rfloor\right\} \text{ for } T_j < T_i;$$

(k) assign a highest harmonicity processor as $M_k$;
     (l) remove task $\tau_i$ from task allocation array $TA_j$ and add task $\tau_i$ to task allocation array $TA_k$;
     (m) perform a second response time test;
     (n) finding a next highest harmonicity processor if the second response time test fails;
     (o) repeating the steps (k) to (m) until the second response time test passes;
     (p) determine the Sys-clock frequency $F^H_i$ of processor of $M_k$ as a minimum frequency enabling processor $M_k$ to complete its tasks before their respective deadlines;
     (q) test the Sys-clock frequency to see if the Sys-clock frequency is greater than $F^d_i$;
     (r) update density $d_k$ and return $TA_1$ to $TA_m$ and return $F_1$ to $F_m$ if $F^H_i$ is not greater than $F^d_i$; and, (s) otherwise, if $F^H_i$ is greater than $F^d_j$, remove task $\tau_i$ from $TA_k$ and add task $\tau_i$ to $TA_j$ and update density $d_j$.

2. The multiprocessor system of claim 1 further comprising:
a power management processor separate from the plurality of processors; and
wherein the means for allocating the plurality of tasks is embodied in the power management processor.

3. The multiprocessor system of claim 1 wherein the power management technique is dynamic voltage scaling.

4. The multiprocessor system of claim 1 wherein the power management technique is dynamic voltage and frequency scaling.

5. A method of allocating a plurality of tasks in a multiprocessing environment having n processors $M_1, \ldots, M_n$, comprising steps of:
(a) associating a worst-case number of processor cycles $C_i$ needed for completion, a period $T_i$, and a deadline $D_i$ for each task $\tau_i$ of a plurality of tasks;
(b) calculating a task density $d_i$ for each task $\tau_i$ as follows $$d_i = \frac{C_i}{D_i};$$

(c) storing each task density $d_i$ in a first density array;
(d) storing each task $\tau_i$ in non-increasing order of density in a second array;
(e) selecting a processor $M_j$ having a minimum task density between $d_1$ and $d_n$ for each task $\tau_i$ in the second array;
(f) adding the task $\tau_i$ to a task allocation array $TA_j$;
(g) performing a first response time test to identify if the selected processor $M_j$ can performance the added task $\tau_i$ without violating its allotted time slot;
(h) if the first response time test does not pass, select a processor $M_j$ having a next lowest task density between $d_1$ and $d_n$ for each task $\tau_i$ in the second array and repeat until the first response time test passes;

(i) determining a Sys-clock frequency $F^d_j$ of $M_j$ as a minimum frequency enabling processor $M_j$ to complete its tasks before their respective deadlines;
(j) calculating a harmonicity $H_i$ of each task $\tau_i$ for processors $M_1, \ldots, M_n$ as follows $$H_i = \sum_j \left\{ \left(\frac{T_i}{T_j}\right) - \left\lfloor \frac{T_j}{T_j} \right\rfloor \right\} \text{ for } T_i < T_j, k \le n, \text{ and}$$

$$= \sum_j \left\{ \left(\frac{T_j}{T_i}\right) - \left\lfloor \frac{T_j}{T_i} \right\rfloor \right\} \text{ for } T_j < T_i;$$

(k) assigning a highest harmonicity processor as $M_k$;
(l) removing task $\tau_i$ from task allocation array $TA_j$ and adding task $\tau_i$ to task allocation array $TA_k$;
(m) performing a second response time test;
(n) finding a next highest harmonicity processor if the second response time test fails;
(o) repeating the steps (k) to (m) until the second response time test passes;
(p) determining the Sys-clock frequency $F^H_i$ of processor of $M_k$ as a minimum frequency enabling processor $M_k$ to complete its tasks before their respective deadlines;
(q) testing the Sys-clock frequency to see if the Sys-clock frequency is greater than $F^d_i$;
(r) updating density $d_k$ and returning $TA_1$ to $TA_m$ and returning $F_1$ to $F_n$, if $F^H_i$ is not greater than $F^d_i$; and,
(s) otherwise, if $F^H_i$ is greater than $F^d_i$, removing task $\tau_i$ from $TA_k$ and adding task $\tau_i$ to $TA_j$ and updating density $d_j$.

6. The multiprocessor system of claim 1 wherein:
the plurality of processors are similar in processing power, speed and energy characteristics; and
the power management processor is lower power than the plurality of processors.

7. The multiprocessor system of claim 2 wherein:
the means for allocating the plurality of tasks is embodied in one of the plurality of processors.

* * * * *